Feb. 12, 1935. R. STAIR 1,990,920
TESTING APPARATUS FOR RADIORECEIVERS AND PARTS THEREOF
Filed June 12, 1929 4 Sheets-Sheet 1
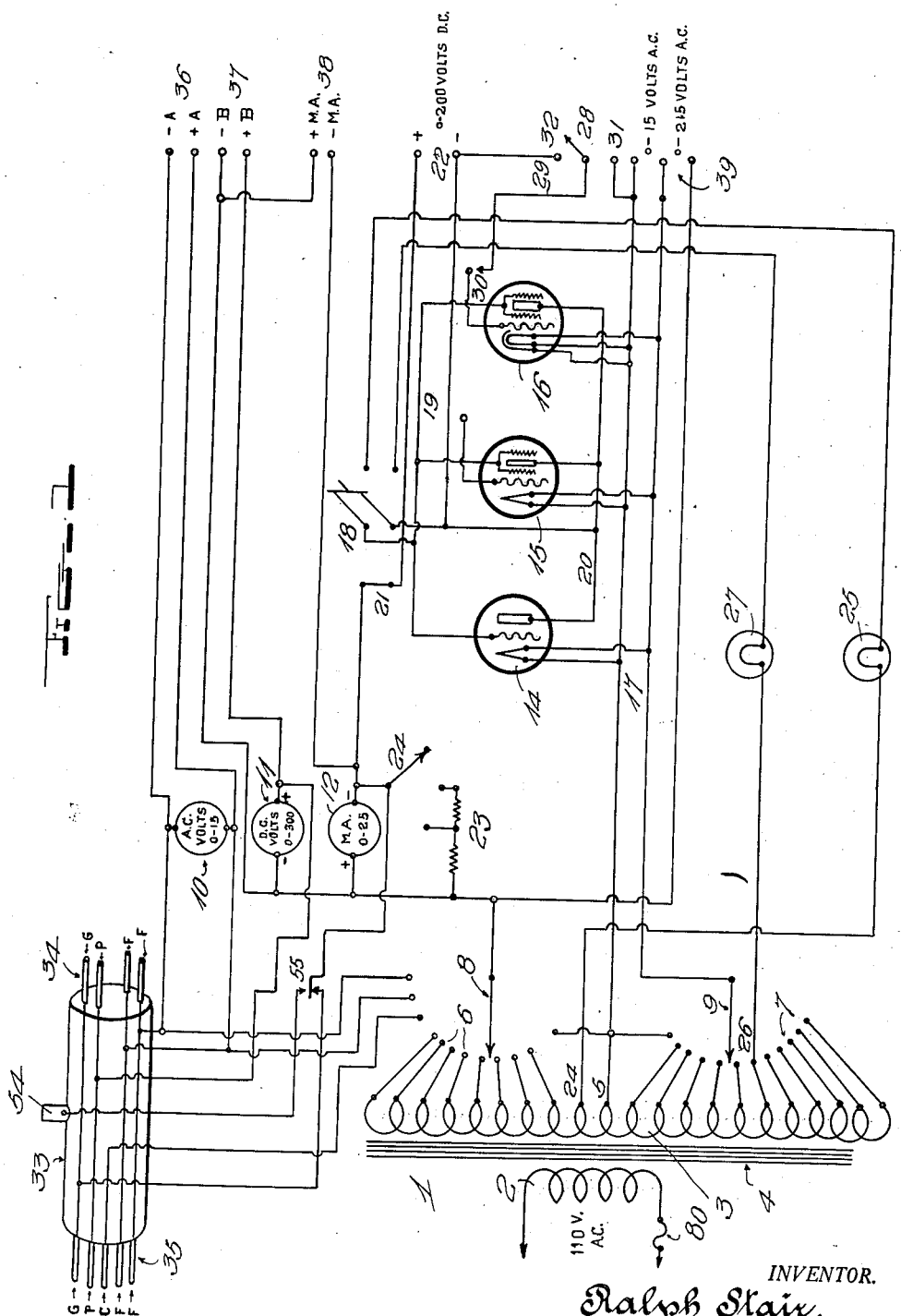
INVENTOR.
Ralph Stair,
BY John B. Brady
ATTORNEY.

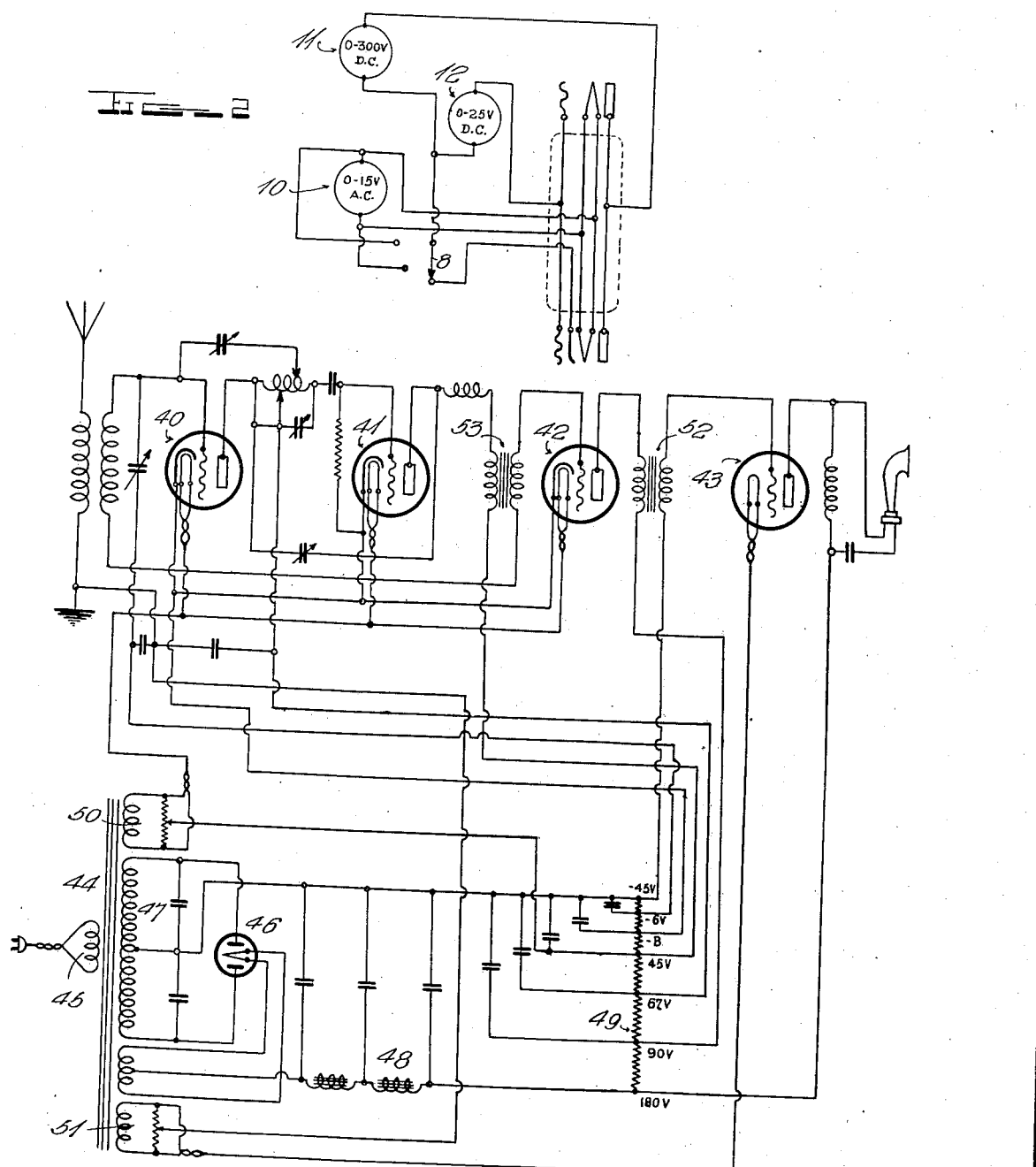

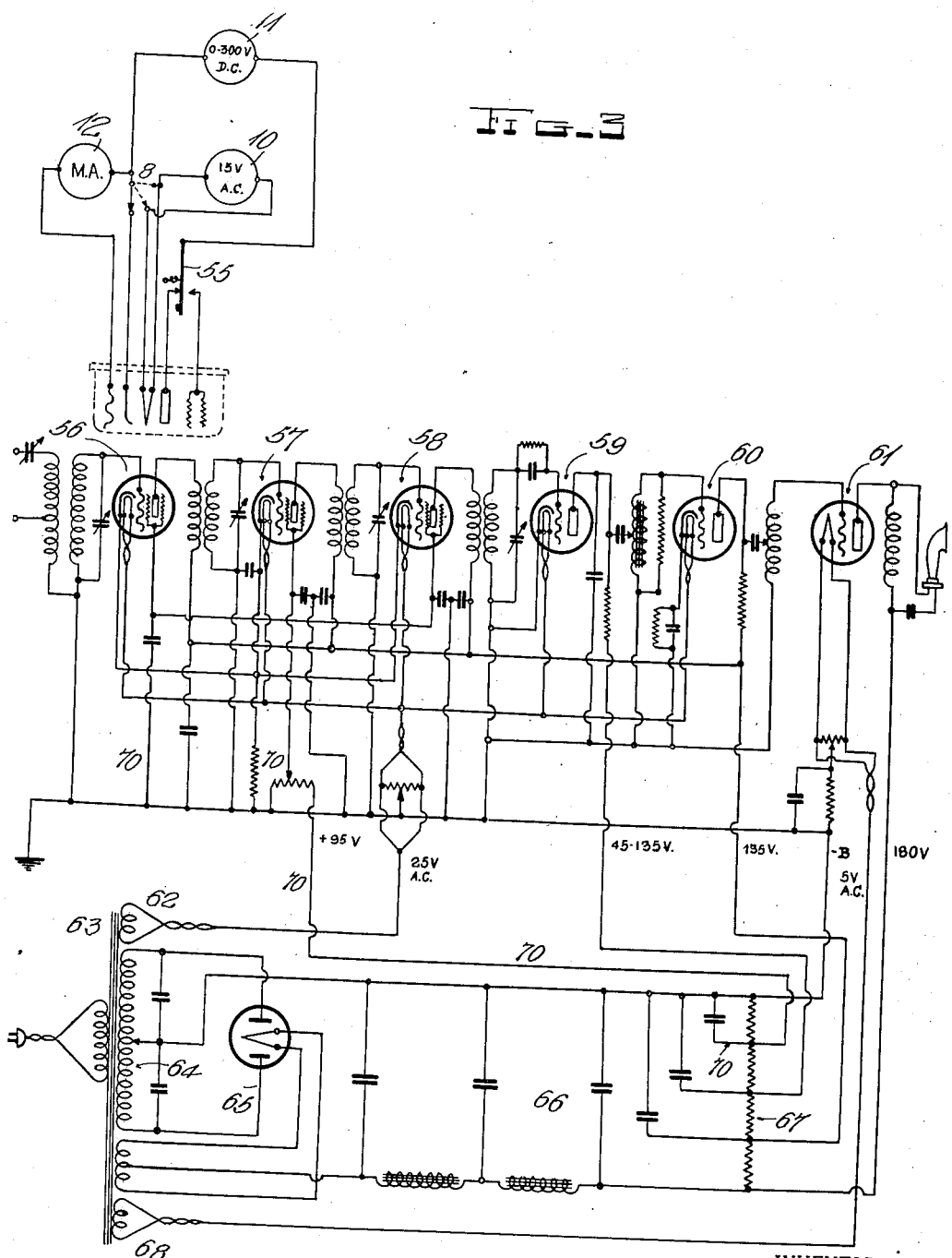

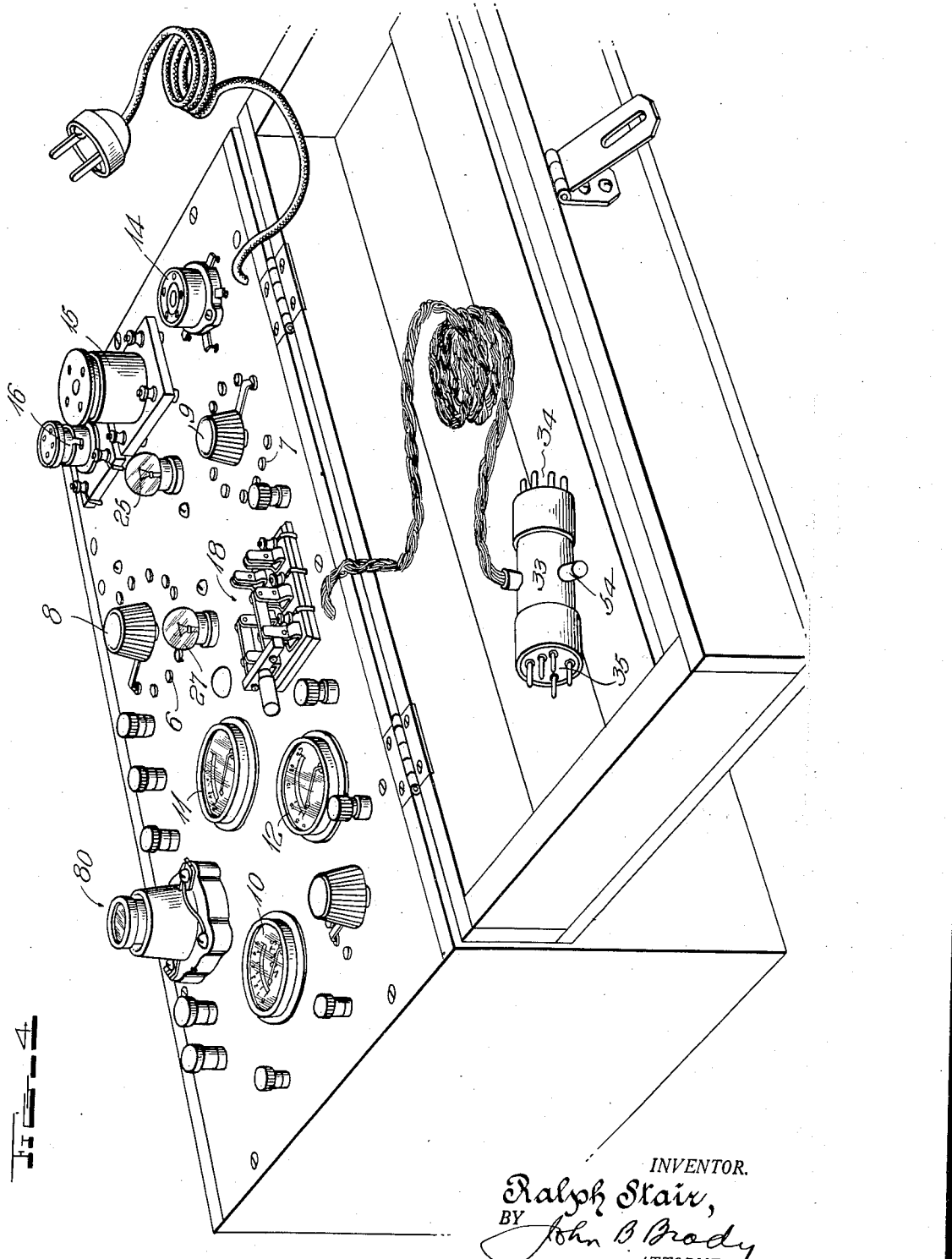

Patented Feb. 12, 1935

1,990,920

UNITED STATES PATENT OFFICE 1,990,920

TESTING APPARATUS FOR RADIO RECEIVERS AND PARTS THEREOF

Ralph Stair, Washington, D. C., assignor to Selden R. Winters, Washington, D. C.

Application June 12, 1929, Serial No. 370,340

12 Claims. (Cl. 250—20)

My invention relates broadly to testing apparatus and more particularly to apparatus for testing the circuits of an electron tube amplifier, electron tubes and associated units in an electron tube amplification system.

One of the objects of my invention is to provide a portable apparatus which may be readily transported to the electron tube apparatus to be tested and electrically connected with different parts of the apparatus on test for locating the fault and permitting prompt repair of the apparatus on test.

Another object of my invention is to provide a portable testing unit for electron tube amplification systems particularly as incorporated in radio broadcast receiving apparatus having means for supplying power of different characteristics and values for energizing parts of the apparatus on test for securing indications as to the condition of the parts of the apparatus on test.

Still another object of my invention is to provide a testing apparatus for radio broadcast receiving sets, which apparatus is universally adapted for determining the location of faults in the circuits of a broadcast receiving set independently of the type of electron tube which may be employed in the set.

A further object of my invention is to provide a testing apparatus for radio broadcast receiving apparatus where means are provided for visually indicating a condition of short circuit between the electrodes of the electron tubes of the amplifier system of the receiving apparatus.

A still further object of my invention is to provide a testing apparatus for radio receiving sets wherein the testing apparatus has means for the rejuvenation of electron tubes and means for furnishing power of selected characteristics to different parts of a receiving apparatus in which the rejuvenated tubes are intended to function for permitting a thorough repair and restoration of the radio receiving set and parts thereof.

Still another object of my invention resides in the provision of a universally applicable testing apparatus for a radio broadcast receiving set for determining the electrical condition of different elements of the receiving system and locating by the actuation of indicating meters the position of faults in a receiving system to permit the ready repair thereof.

A still further object of my invention is to provide a testing apparatus particularly adapted for the location of faults in a radio broadcast receiving set where the electron tube circuits of the receiving set are energized from alternating current and in which faults, such as the burning out of a transformer winding or the shorting of a condenser may be readily located and repaired without an extensive search through the wiring of the receiving set.

Other and further objects of my invention reside in the provision of a compact form of testing apparatus, as set forth more fully in the specification hereinafter following by reference to the accompanying drawings in which:

Figure 1 diagrammatically illustrates the testing apparatus of my invention showing electron tubes inserted therein for a process of rejuvenation; Fig. 2 diagrammatically illustrates an alternating current operated radio receiving apparatus and the connection thereto of the testing apparatus of my invention for locating faults in the receiving apparatus; Fig. 3 shows an application of the testing apparatus of my invention to the screen grid type of receiving circuit; and Fig. 4 is a view of the portable apparatus embodying the circuit arrangements set forth in Fig. 1, which apparatus I employ in investigating the condition of the circuits of a radio receiving apparatus.

In modern broadcast receiving sets wherein the circuits are supplied from an alternating current power source it is usual to provide relatively high potentials for the plate energization throughout the circuits of the receiving set. Relatively heavy currents sometimes exist in the different parts of the circuits of the receiving apparatus which give rise to the possibility of destruction of the different elements of the receiving circuit. Receiving circuits often fail by reason of the destruction of one of the windings of the coupling transformers or the destruction of a condenser in the filter system or the short circuiting of the elements in the electron tubes in the receiving set. Due to the complications in wiring, particularly in A. C. receiving sets, which incorporates in addition to the usual amplification system additional means for eliminating hum of the alternating current, the location of a hidden fault in the circuits of a receiving set is often tedious and time consuming. With the apparatus of my invention the location of a fault in any part of the receiving apparatus may be readily determined.

Special provision is made in the testing apparatus of my invention for the supplying of potential to those parts of the circuits which may become deenergized by failure of some part of the circuit in order to permit the correction of the hidden fault. Where tubes have their elements short circuited such defect is readily shown in the apparatus of my invention by a visual signal mounted on the panel of the equipment, one signal indicating a condition of short circuit between the plate and cathode electrode and a different signal indicating a condition of short circuit between the control electrode and cathode or between the screen grid and any of the other electrodes.

Special provision is made for the universal application of the testing apparatus of my invention to circuits employing the screen grid tube and circuits employing the indirect heater type of tube. I provide a reversible plug carrying prongs thereon, which prongs correspond to the number of contacts within the socket of the particular type of tube which is employed in the apparatus. Provision is made for the supply of alternating current to the receiving apparatus on test in voltage steps of desired values, such as steps of one or two volts, from zero up to approximately 200 volts. Provision is made for the supply of direct current which is rectified from the alternating current power supply in suitable voltage steps for the testing of radio accessories or parts of the receiving apparatus for shorts and broken circuits and also for the purpose of temporarily supplying direct current voltages to the filter system of the apparatus on test in the event of destruction of the rectifier tube or high voltage winding of the power transformer. The apparatus of my invention also provides means for testing all types of rectifier and power tubes, of both the filament and non-filament types.

The apparatus of my invention is wholly portable and may be carried to a defective receiving set and utilized as a temporary power source where it is found that any parts of the power supply circuit in a set may have been destroyed, while testing the apparatus for defects in other parts of the circuits or elements thereof.

Referring to the drawings, reference character 1 designates a power transformer including a primary winding 2 supplied from an alternating current source through protective fuse 80 and a secondary winding 3 disposed on an iron core 4 with a multiplicity of taps extending from the secondary winding. The taps are arranged in separate sections on opposite sides of a central point 5 in the secondary winding 3. The secondary winding 3 is divided into two portions, one of which includes taps 6 and the other of which includes taps shown at 7. Separate switches 8 and 9 move over the different sets of contacts as shown. Independent sets of meters are provided in the testing apparatus, as shown at 10, which designate a voltmeter having a range, which may be zero to 15 volts for A. C. potentials, meter 11 which may be a direct current voltmeter having a range from zero to 300 volts and a meter 12, which may be a milliammeter having a range from zero to 25 milliamperes. Other combinations of meters may be employed for I may utilize several meters acting coordinately to cover different ranges.

I provide a multiplicity of sockets on the testing apparatus to receive the various types of electron tubes which are to be rejuvenated or tested, the tubes being connected in the sockets, as represented at 14, 15 and 16. The cathode circuit for the several tubes is represented at 17, one side of which extends to the mid-tap 5 and the other side of which connects through switch 9 to any one of the taps in the set of taps 7 on one portion of the secondary winding 3, by which selected potentials may be applied to the cathodes of the several tubes.

I provide a double pole, double throw switch 18 mounted on top of the panel of the apparatus. The switch blades are connected to the grids and plate electrodes respectively, of the several tubes which are bonded in the several sockets by bus connections 19 and 20. When thrown to the left the grid and plate electrodes are shunted through the short circuit path 21 enabling the tubes 14, 15 and 16 to set conjointly as a two electrode rectifier for the supply of direct current potential at terminals 22.

A voltage variation of from zero to 200 volts of direct current is obtained by varying the position of switch 8 over the set of contacts 6. A suitable arrangement of shunts may be provided at 23 operated by means of switch 24 for changing the range of meter 12 under different conditions. It will be observed that the sockets 14, 15 and 16 while normally inserted for the purposes of rejuvenation and testing of tubes may also be employed as rectifiers to obtain the required potential for test purposes or for conditions of temporary operation at terminals 22.

In order to determine the condition of conductivity between the grid, cathode, plate and screen grid electrodes or indirect heater electrodes of the electron tubes, the switch 18 is moved to the right, which connects the grid and filament across a potential supply circuit, as indicated in Fig. 1, the supply circuit being formed by the portion 24 in series with the indicator lamp 25. If any circuit exists between the filament and grid the lamp 25 will light. Similarly, the plate and cathode have a potential impressed across their circuits from winding 26 of secondary winding 3 in series with lamp 27, and if a short circuit exists between the electrodes this would be immediately observed by the lighting of the lamp 27.

As shown in Fig. 4, the lamps 25 and 27 are mounted on a panel of the testing apparatus and may be red and green for the purpose of determining whether the short circuit occurs between the grid and cathode or the plate and cathode. Where the tubes are of the screen grid type, I provide a switch 28 having a flexible connector 29, which may connect to the control grid terminal 30 of the screen grid type of tube. The contact 31 of switch 28 connects to the cathode circuit. The contact 32 of switch 28 connects to the plate circuit 20.

By throwing switch 28 in an upward position where the switch blade contacts with contact 32, the flexible connection 29 being connected to the control grid terminal 30, the control grid and plate electrodes are then connected in common for rectifying purposes. For testing the control grid with respect to freedom from short circuit with other electrodes of the tube, the switch 18 is thrown to the right. Then when throwing the switch 28 downwardly the control grid is short circuited to the filament. When thrown upward the control grid is shorted to the plate. Any short circuit between the grid and the control grid, filament or plate will show on the respective lamps 25 and 27. When the lamps are all clear the freedom from short circuit between the electrodes is clearly indicated.

In order to determine the continuity of the circuits within a radio receiver a double ended reversible plug 33 is provided. The end 34 of the plug 33 is adapted for insertion in sockets of the three electrode type. The opposite end of the plug represented at 35 is adapted for insertion in sockets of the indirect heater type of tube. Proper connections are established within the plug for interconnecting the pin terminals at each end thereof, as I have designated by letters on the several pins. Connections are taken from the conductors within the plug to the several meters, as shown in Fig. 1. The effective connection of the meter to the radio receiver has been shown more clearly in Fig. 2.

In order to provide proper means for the distribution of power from the apparatus, I position sets of terminals on the panel of the apparatus, as designated at 36, 37, 38 and 39, by which connections may be made to the several meters in the apparatus for connection to external circuits.

In order to provide a source of alternating current for the testing of apparatus or the energization of an A. C. operated radio receiver over the time interval in which the set is being tested for other defects, I provide a set of terminals 39 on the apparatus panel by which a voltage range of alternating current from zero to approximately 200 volts is obtained. This source is especially desirable for supply to the input of a rectifier system in the event of failure of the input circuit of the rectifier.

In Fig. 2 I have shown the testing apparatus applied to the circuits of an alternating current operated radio receiver, which includes one stage of tuned radio frequency amplification involving tube 40, a detector tube 41 and two stages of audio frequency amplification designated by tubes 42 and 43. The power supply to the apparatus is obtained through power transformer 44 having primary winding 45. Energy is delivered to a full wave rectifier system 46 through secondary winding 47 to the filter circuit 48, and from the filter circuit to the potentiometer system 49 for distribution to the several stages of the electron tube amplifier system. Secondary winding 50 supplies cathode heating current to the indirect heater type of tubes shown at 40, 41 and 42. Secondary winding 51 supplies cathode heating current to the power amplifier tube designated at 43. The circuits which I have designated as comprising the filament winding 50 and the cathode of tube 42, forming connections to any selecting socket of the radio receiver, are tested by voltmeter 10. The circuits, which include the filament heating system 50, the rectifier filter and potentiometer system and the connection through the primary winding of audio frequency transformer 52, are tested by means of meter 11. These circuits including the rectifier system, the filter circuit, the potentiometer circuit and the connection to the secondary winding of the input transformer 53, are tested by meter 12. Any opening in the transformer windings, or in any part of the several circuits, will be promptly discovered by readings of the meters 10, 11 or 12, and corrections thereafter made.

In Fig. 3 I have shown a system for testing the circuits of a screen grid receiving system, wherein a terminal 54 (see Fig. 1) is provided on one side of the reversible plug 33 for connection to the control grid terminal of the sockets in the radio receiver. A switch 55 is provided in the testing apparatus, which switch controls the connection of the voltmeter 11 to either the plate electrode or to the screen grid electrode. Normally the meter 11 is connected to test the continuity of the plate circuit of the radio receiver, but by depressing switch 55 the meter 11 may be connected to contact 54 to the screen grid circuit for determining the electrical continuity thereof. In order to get the screen grid test, switch 55 must be depressed and meter 11 observed.

As shown more particularly in Fig. 3, the meters 10, 11 and 12 test the different circuits of a screen grid receiver, meter 11 being used alternately to test the plate circuit and the screen grid circuit by operation of switch 55. The screen grid receiver is shown diagrammatically as including tubes 56, 57 and 58 constituting three stages of radio frequency amplification, tube 59 constituting a detector and tubes 60 and 61 constituting stages of audio frequency amplification.

The cathode heating current for the indirect heater type of tubes employed at 56, 57, 58, 59 and 60 obtain their cathode heating current from winding 62 of power transformer 63. Secondary winding 64 supplies energy to the full wave rectifier 65, which supplies energy in turn to the filter circuit 66 and to potentiometer 67 from which desired values of energy may be impressed upon the different circuits of the A. C. receiver. The cathode heating current for the power amplifier tube 61 is supplied from winding 68. The testing apparatus is employed to determine the continuity of the screen grid circuit extending along connection 70 to the potentiometer system, the filter circuit and the rectifier by depressing switch 55 to connect the screen grid circuit with meter 11. When the push button or switch 55 is in normal position the indirect heater element, or circuit containing the electron emitting element and plate circuit, is tested for electrical continuity. The cathode heater circuit is further tested by readings of voltmeter 10. The circuit which connects to the control electrode or grid elements is tested by meter 12 acting as a D. C. voltmeter. The continuity of the circuit is examined by individual applications of the test plug into each of the sockets successively.

The same method of procedure is carried out in testing the circuits illustrated in Fig. 2, that is, the test plug is inserted successively in each socket of the radio broadcast receiver and readings of the several circuits noted on the meters 10, 11 and 12. By examining the several circuits and eliminating circuits which are not defective, it is a relatively simple matter to locate the defect.

The complications in wiring in modern broadcast receivers employing alternating current as a power source offer many difficulties to the repairman. By my invention I have found that latent faults may be readily discovered and corrected with minimum time and effort. The apparatus of my invention has proven highly practical in its construction and successful in its operation.

While I have described a preferred embodiment of my invention, I desire that it be understood that modifications may be made and that no limitations upon my invention are intended other than those imposed by the scope of the appended claims.

What I claim as new and desire to secure by Letters Patent of the United States is as follows:

1. In a system for testing radio receivers an apparatus comprising a local power source adapted to be substituted for the normal power source for a radio receiver, means for establishing selected values of direct and alternating current in said apparatus, a plug carrying contacts arranged to establish connection with the circuits terminating in each of the sockets of the radio receiving apparatus, meters connected in the circuits leading from said plug for indicating the condition of the electrical circuits of the electron tube amplifier system when selected values of energy are impressed upon selected circuits of the electron tube amplifier system from said local power source when substituted for the normal power source.

2. In an apparatus for testing the continuity of the circuits in an electron tube amplifier system, a multiple connector plug arranged to be inserted in each of the sockets of the amplifier system for establishing connection with the separate circuits of the electron tube amplifier system, meters in said apparatus individual to each of the circuits of the amplifier system and means in said apparatus for supplying selected values of direct and alternating current to the circuits of said electron tube amplifier independent of the normal power supplied thereto for enabling the electrical continuity of the circuits of said amplifier to be determined according to the indications on said meters.

3. In an apparatus for testing the circuits of electron tube amplifier systems employing electron tubes of different types, a plug member having contacts formed on opposite ends thereof and reversible to enter the sockets of different types in an amplifier system, connections extending between the contacts on opposite ends of said plug, meters in circuit with said connections and switching means for rendering selected ones of said meters effective for determining the electrical continuity of the circuits of said electron tube amplifier system independently of the type of electron tube employed in the amplifier system.

4. In an apparatus for determining the electrical continuity of the circuits of electron tube amplifiers employing electron tubes of different types, a double ended plug having a multiplicity of contacts arranged on each end thereof corresponding to the number of electrodes employed in the tubes adapted to be operated in selected sockets of the electron tube amplifier system, a multiplicity of indicating meters, connections between said indicating meters and the contacts on said plug for the connection of said meters with the circuits of said electron tube amplifier system independent of the type of electron tube employed in the electron amplifier system according to the end of said plug that is inserted into said sockets.

5. In an apparatus for testing the circuits of broadcast receiving apparatus including electron tube amplifiers, a multiplicity of test circuits, a reversible plug having connections extending to said multiplicity of test circuits said plug having contacts on opposite ends thereof and adapted to be selectively inserted in the various sockets of said electron tube amplifier independent of the type of tubes employed in said sockets for completing electrical connections between said multiplicity of test circuits and the circuits of the electron tube amplifier.

6. In a testing apparatus for the circuits of electron tube amplification systems employing electron tubes of the screen grid type, a multiplicity of testing circuits, a plug having contacts with each end thereof insertable into the various sockets of the electron tube amplification system for establishing connection between the electron tube amplification system for establishing connection between the electron tube amplification circuits and said multiplicity of testing circuits, an auxiliary contact carried by said plug, a connection extending from said auxiliary contact to said multiplicity of test circuits, said auxiliary contact being connectable to the control grid circuits of the electron tube amplification system.

7. In a testing apparatus for determining the electrical continuity of the circuits of an electron tube amplifier employing screen grid tubes, a reversible plug carrying contacts on each end thereof and selectively insertable into the sockets of the electron tube amplifier, a contact carried by said plug intermediate the contacts on the ends thereof for establishing connection with the control grid circuit of said electron tube amplifier, a multiplicity of testing circuits, switching means in said circuits and connections extending from the contacts on each end of said plug and from the intermediate contact carried by said plug to said switching means and to said multiplicity of testing circuits for effecting test operations of said circuits.

8. In a testing apparatus for determining the electrical continuity of the circuits of an electron tube amplifier employing screen grid tubes, a reversible plug carrying contacts on each end thereof and insertable into the sockets of the electron tube amplifier, a contact carried by said plug intermediate the contacts on the ends thereof for establishing connection with the control grid circuit of said electron tube amplifier, a multiplicity of testing circuits, connections extending from the contacts on each end of said plug and from the intermediate contact carried by said plug to said multiplicity of testing circuits, and means for rendering said intermediate contact alternately effective with a selected one of the contacts on the opposite ends of said plug in connection with said multiplicity of testing circuits.

9. A testing system for an electron tube having a cathode and a plurality of cold electrodes, a source of potential, connections between points of different potential on said source of potential and said cathode and each of said cold electrodes, and a separate incandescent lamp disposed in series with each of the connections leading to said cold electrodes and independently energizable when a short circuit exists between said cathode and the cold electrode with which the particular incandescent lamp is connected.

10. A testing system for an electron tube having a cathode and a plurality of cold electrodes, a source of alternating current, a transformer having primary and secondary windings, with the primary winding thereof connected with said source and the secondary winding thereof having taps thereon at points of different potential along the length thereof, a connection between one of said taps and the cathode of said electron tube, connections between others of said taps and the individual cold electrodes in said electron tube, and a separate incandescent lamp connected in each of said last mentioned connections, said incandescent lamps being operative under a condition of short circuit between the cold electrode with which the incandescent lamp is connected and the cathode for indicating a defect in said electron tube and determining the location therein.

11. A testing system for an electron tube having a cathode and a plurality of cold electrodes, a source of alternating current, a transformer including primary and secondary windings, with the primary winding thereof connected with said source of alternating current and the secondary winding thereof having taps along the length thereof spaced at different potential positions, a connection between the cathode and one of said taps and connections between the individual cold electrodes and others of said taps, a separate incandescent lamp connected in series in each of said last mentioned connections and adapted to independently glow under conditions of a short circuit between said cathode and the cold electrode with which the incandescent lamp is connected and switch means for simultaneously completing the connections to all of said incandescent lamps.

12. In a system for testing the circuits of electron tube amplifiers and determining the condition of the electron tubes connected therein, means for impressing a predetermined potential across selected pairs of the electrodes of the electron tubes, a separate indicator individual to each pair of electrodes, and multiple pole switching means for simultaneously establishing connection between an individual indicator and the selected pair of electrodes adapted to be associated therewith for determining the continuity of the circuit between the said electrodes and simultaneously indicating the location of a short-circuit condition between any pair of said electrodes.

RALPH STAIR.